(12) United States Patent
Belanger et al.

(10) Patent No.: US 9,199,613 B2
(45) Date of Patent: Dec. 1, 2015

(54) MEDIA ELEMENT FOR A VEHICLE WASH COMPONENT

(71) Applicants: Michael J. Belanger, Northville, MI (US); Barry S. Turner, Novi, MI (US); Thomas E Weyandt, Northville, MI (US)

(72) Inventors: Michael J. Belanger, Northville, MI (US); Barry S. Turner, Novi, MI (US); Thomas E Weyandt, Northville, MI (US)

(73) Assignee: Belanger, Inc., Northville, MI (US)

( * ) Notice: Subject to any disclaimer, the term of this patent is extended or adjusted under 35 U.S.C. 154(b) by 420 days.

(21) Appl. No.: 13/668,029

(22) Filed: Nov. 2, 2012

(65) Prior Publication Data

US 2013/0104332 A1    May 2, 2013

Related U.S. Application Data (60) Provisional application No. 61/554,559, filed on Nov. 2, 2011, provisional application No. 61/556,893, filed on Nov. 8, 2011, provisional application No. 61/642,831, filed on May 4, 2012.

(51) Int. Cl.
| | |
|---|---|
| *B60S 1/66* | (2006.01) |
| *B60S 3/06* | (2006.01) |
| *A46B 7/10* | (2006.01) |
| *A46B 13/00* | (2006.01) |
| *B60S 3/04* | (2006.01) |

(52) U.S. Cl.
CPC . *B60S 3/063* (2013.01); *A46B 7/10* (2013.01); *A46B 13/001* (2013.01); *B60S 3/04* (2013.01); *B60S 3/06* (2013.01); *B60S 3/066* (2013.01); *A46B 2200/3046* (2013.01); *Y10T 29/49826* (2015.01)

(58) Field of Classification Search
CPC ............... A46B 13/001; A46B 7/10; A46B 2200/3046; B60S 3/06; B60S 3/063; B60S 3/066; B60S 3/04
See application file for complete search history.

(56) References Cited

U.S. PATENT DOCUMENTS

| | | |
|---|---|---|
| 3,693,206 A | 9/1972 | Tatara et al. |
| 4,009,303 A | 2/1977 | Faris |
| 4,024,598 A | 5/1977 | Miner |
| 5,012,360 A | 4/1991 | Yamauchi et al. |
| 5,134,742 A | 8/1992 | Ennis |
| 5,784,748 A | 7/1998 | Belanger et al. |

(Continued)

FOREIGN PATENT DOCUMENTS

| | | |
|---|---|---|
| EP | 0667268 A2 | 8/1995 |
| EP | 1394294 A1 | 3/2004 |

(Continued)

OTHER PUBLICATIONS

Partial Machine Translation of JP 2001-18767, Jan. 23, 2001.

*Primary Examiner* — Shay Karls
(74) *Attorney, Agent, or Firm* — John S. Artz; Dickinson Wright PLLC (57) ABSTRACT

A method of forming a vehicle wash component includes the step of providing a mold for forming at least one media element for the vehicle wash component. The at least one media element includes a first segment to facilitate attachment to a vehicle wash component, and a second segment for contacting a vehicle to provide a cleaning function. A polymer compound is injected into the mold to form the at least one media element. The molded media element is removed from the mold and then attached to a hub portion of the vehicle wash component.

21 Claims, 6 Drawing Sheets

(56) References Cited

U.S. PATENT DOCUMENTS

| | | |
|---|---|---|
| 6,532,615 B2 | 3/2003 | Clark |
| 7,743,454 B2 | 6/2010 | Favagrossa |
| 7,805,798 B2 | 10/2010 | Belanger |
| 8,495,786 B2 | 7/2013 | Naftal |
| 2004/0200024 A1 | 10/2004 | Yamin |
| 2005/0235443 A1 | 10/2005 | Mathys et al. |
| 2006/0168752 A1* | 8/2006 | Levesque .................. 15/230.16 |
| 2006/0207047 A1 | 9/2006 | Weyandt |
| 2007/0151054 A1 | 7/2007 | MacNeil |
| 2008/0078048 A1 | 4/2008 | Belanger |
| 2009/0217944 A1 | 9/2009 | Munera et al. |
| 2009/0250086 A1 | 10/2009 | Belanger et al. |
| 2009/0250993 A1 | 10/2009 | Vivyan et al. |
| 2010/0170543 A1 | 7/2010 | Wimmer et al. |
| 2011/0138558 A1* | 6/2011 | Favaqgrossa .................. 15/160 |
| 2011/0247161 A1 | 10/2011 | Botella Pla et al. |
| 2013/0019419 A1 | 1/2013 | Favagrossa |
| 2013/0180064 A1 | 7/2013 | Belanger et al. |
| 2014/0259502 A1 | 9/2014 | Vitucci-Schneider |
| 2014/0259727 A1 | 9/2014 | Belanger et al. |
| 2014/0283320 A1 | 9/2014 | Tyrrell et al. |

FOREIGN PATENT DOCUMENTS

| | | |
|---|---|---|
| JP | 410244911 A | 9/1998 |
| JP | 2001018767 A | 1/2001 |
| JP | 2005170221 A | 6/2005 |
| JP | 2007260379 A | 10/2007 |
| JP | 2008061723 A | 3/2008 |
| JP | 2009055960 A | 3/2009 |

* cited by examiner

MEDIA ELEMENT FOR A VEHICLE WASH COMPONENT

CROSS-REFERENCE TO RELATED APPLICATIONS

The present application claims priority to U.S. Provisional Patent Application Ser. No. 61/554,559, entitled "Car Wash Implement and Splayable Foam Plastic Element for Use in Constructing Same", which was filed on Nov. 2, 2011; U.S. Provisional Patent Application Ser. No. 61/556,893, entitled "Injection Molded Foamed Polymeric Car Wash Media", which was filed on Nov. 8, 2011; and U.S. Provisional Patent Application Ser. No. 61/642,831, entitled "Top Brush", which was filed on May 4, 2012, the disclosures of which are hereby incorporated by reference as though set forth fully herein. The present application is related to Applicant's concurrently filed U.S. patent application Ser. No. 13/668,058, entitled "An Improved Vehicle Wash Component", filed Nov. 2, 2012; U.S. patent application Ser. No. 13/668,093, entitled "An Illuminated Hub for a Vehicle Wash Component", filed Nov. 2, 2012; U.S. patent application Ser. No. 13/668,121 entitled "A Hub for a Vehicle Wash Component Having an Arcuate Pattern of Media Elements", filed Nov. 2, 2012, the disclosures of which are hereby expressly incorporated by reference as though set forth fully herein.

FIELD OF THE DISCLOSURE

The present invention relates generally to a vehicle wash media for use in cleaning a vehicle exterior in a vehicle wash facility. More specifically, the present invention relates to a material, configuration, and method of manufacturing an improved vehicle wash media for attachment to a vehicle wash component.

BACKGROUND

The vehicle wash market generally separates itself into two major groups, friction and touchless. Many consumers avoid friction vehicle washes due to concerns of vehicle damage and the desire to avoid the noise associated with the media elements slapping a vehicle. These consumers choose touchless vehicle washes that use chemicals and high pressure to clean the exterior surface of the vehicle. Touchless washes are generally slower and more costly than friction washes. Currently, friction washes are more common than touchless, but they also have disadvantages.

The wash media elements utilized with existing friction washes have been fabricated in various forms and by various manufacturing processes. The initial wash media elements for these friction washes consisted of plastic bristles, which were known to cause damage to a vehicle exterior. These washes thus began employing a wash media element constructed of soft cloth in order to reduce the potential harm to a vehicle exterior. Still later, foam media elements were introduced that were lighter in weight and yielded increased longevity.

While each current media element has its advantages, each also has known disadvantages. For example, textile-based washing elements are known to provide better cleaning when properly wetted and lubricated with the proper detergents. They, however, can become heavy when wet, and can be objectionably loud on the surface of the vehicle. Additionally, the bristle and cloth media elements require high RPM to allow sufficient support through centrifugal force in order to properly contact and clean a vehicle exterior. Unfortunately, as the rotational speeds of rotary brushes employing these types of media have increased, the probability of vehicle damage, the noise produced by vehicle washing, and the unpleasantness of the washing experience for vehicle occupants has also increased, often exponentially. However, rotating the brush at slower RPMs is not an option as it does not provide enough support for the elements and they thus will not effectively clean the vehicle.

By contrast, closed-cell foam washing elements remain lighter in weight because they do not absorb water and can support themselves. This will provide a gentler wash with less noise. However, these foam washing elements do not tend to clean as well as textile-based washing elements, particularly at slow speeds.

It would thus be desirable to provide an improved media element that addresses these issues.

SUMMARY OF THE INVENTION

It is therefore an advantage of the present disclosure to provide a vehicle wash media element that provides greater efficiency, superior product qualities and less scrap than prior known processes.

It is a related advantage of the present disclosure to provide a method of forming a vehicle wash media element that achieves these advantages.

It is another advantage of the present disclosure to provide a vehicle wash media element that reduces the potential damage to a vehicle during the wash process.

It is a related advantage of the present disclosure to provide a vehicle wash media element that minimizes any damage to an exterior surface of a vehicle while being cleaned.

It is still another advantage of the present disclosure to provide a vehicle wash media element that generates less noise than prior vehicle wash media.

It is yet another advantage of the present disclosure to provide a vehicle wash media element that yields an enhanced customer experience during the wash process.

It is a further advantage of the present disclosure to provide a vehicle wash media element that has increased longevity.

It is a further advantage of the present disclosure to provide a vehicle wash media element that reduces the wear and tear on the mechanical parts of a vehicle wash component.

In accordance with the above and the other advantages, a method of forming a vehicle wash component is provided. According to an aspect, the method includes providing a mold for forming at least one media element of the vehicle wash component. The at least one media element includes a first segment to facilitate attachment of the element to a vehicle wash component. The at least one media element includes a second segment that provides support to the media element. The at least one media element includes a third segment for contacting a vehicle to provide a cleaning function. According to the next step, a polymer compound is injected into the mold to form the at least one media element. The formed media element is then removed from the mold. Thereafter, the at least one media element can be assembled to a hub portion of the vehicle wash component.

In accordance with other advantages, a media element for attachment to a vehicle wash component is provided. The media element includes a body portion having a length, a width and a height. The body portion includes a segment adjacent an inner end to facilitate attachment of the media element to a hub portion of a vehicle wash component. The body portion includes a second segment for imparting support to the media element. The body portion includes a third segment, including a plurality of contact elements, for contacting a vehicle exterior to effectuate cleaning thereof.

Other advantages of the present invention will be readily appreciated, as the same becomes better understood by reference to the following detailed description when considered in connection with the accompanying drawings.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

DETAILED DESCRIPTION OF THE INVENTION

Figure 1:
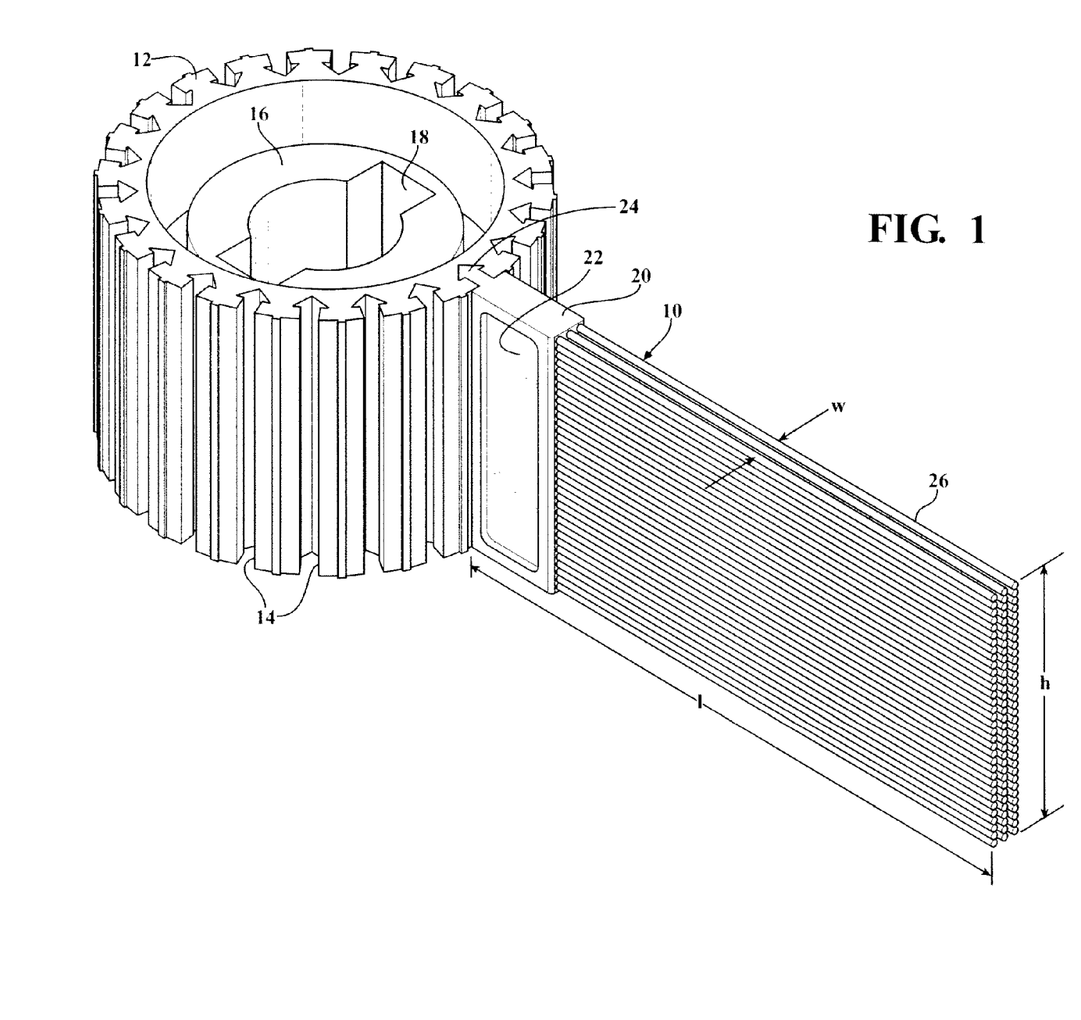
FIG. 1 is a perspective view of a hub portion with a media element attached in accordance with an aspect of the present disclosure.

Referring to FIG. 1, there is shown a first media element 10 assembled to an annular molded hub portion 12. According to an aspect of the disclosure, the hub portion 12 is substantially rigid and may be constructed of a molded plastic material or foam plastic. Alternatively, the hub portion 12 could be constructed of a metal or other suitable material. The hub portion 12 includes an exterior surface with a pattern of circumferentially-spaced, longitudinal slots 14 adapted to receive the media element 10 therein. The hub portion 12 has a plurality of slots 14 for receiving a plurality of media elements. It will be appreciated that the number of slots as well as the relative spacing therebetween can vary. The hub portion 12 may have an integral center portion 16 with a keyway 18 which permits it to be mounted to a shaft for rotation about an axis. When the hub portion 12 rotates, portions of the media elements are caused to contact the exterior surface or surfaces of a vehicle for cleaning or buffing/polishing purposes.

It will be appreciated that the hub portion 12 can take on a variety of different configurations and that the hub portion 12 can have a variety of different securement mechanism to facilitate attachment of the media elements, including channels and keyholes, such as is disclosed in Applicant's co-pending Application Ser. No. 13/668,058, entitled "An Improved Vehicle Wash Component", filed on Nov. 2, 2012 and which is hereby expressly incorporated by reference herein. The securement mechanism may consist of separate structures that are secured to the hub portion 12, such as by welding. It will also be appreciated that the hub portion 12 can be constructed in a variety of different lengths as desired.

Figure 2:
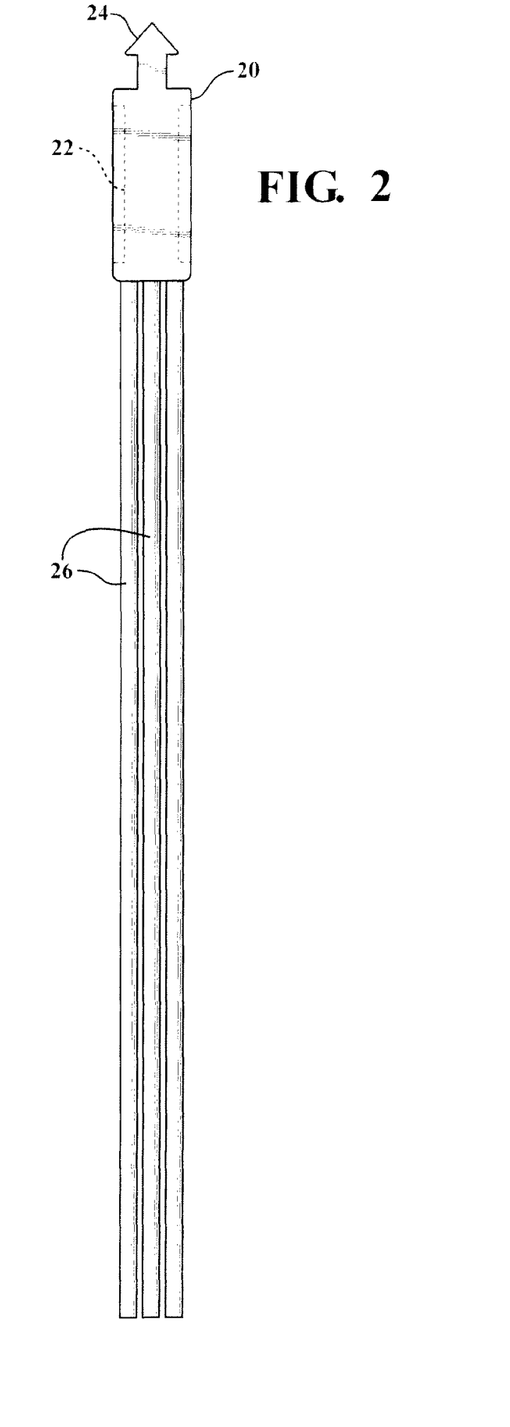
FIG. 2 is a top view of a media element of FIG. 1.

In accordance with an aspect, and as shown in FIGS. 1 and 2, the media element 10 may include a relatively stiff spine or spring portion 20 which is generally rectangular and of a width which corresponds the exterior surface of the hub portion 12 to effectuate engagement therewith. According to an aspect, the spine portion 20 is configured to provide rigidity to the media element, such that it is self-supporting and to assist in providing sufficient pressure on a vehicle exterior during the vehicle wash process to effectively clean the vehicle. The media elements include a length (l), a width (w) and a height (h).

The spine portion 20 may be formed with recesses 22 on either side of the media element 10 to add beam strength to the spine portion 20. The spine portion 20 also preferably includes a protuberance feature 24 which conforms to the interior configuration of one of the slots 14. This can permit the protuberance feature 24 to be inserted by a sliding motion into one of the slots 14 to assemble the media element 10 to the hub portion 12. It will be understood that a brush of greater length may be assembled by stacking hub portions 12 longitudinally on a common shaft with or without spacers therebetween. Alternatively, the media elements 10 can also be constructed of larger sizes.

According to an aspect, the media element 10 may further include a plurality of relatively flexible contact elements or fingers 26. The contact elements 26 may be formed in layers in both the width (w) and height (h) directions. As shown, according to this aspect, the width (w) direction consists of three individual round fingers or strands which are at least partly separated from one another. The contact elements 26 may be at least partly separated from one another both within a layer (height direction) and between layers (width direction) to provide fine detail cleaning capability. As shown, the contact elements 26 may be integral with the spine portion 20 and extend outwardly at substantially right angles therefrom. Broadly, the media element 10 includes a first portion, which facilitates engagement with a hub portion, a second portion that provides the media element with self-supporting qualities, and a contact portion for engaging and cleaning a vehicle exterior.

According to an aspect, the entire media element 10 may be formed by injection molding a compound of a polymer such as polyethylene alloyed with EVA and a foaming agent, wherein the molding step produces the media element 10 substantially in its final form. It will be understood that depending on mold quality, some individual slicing or separating of the finger elements may be necessary. In accordance with one aspect, the density of the closed cell polyethylene/EVA foam plastic in the final product can be on the order of about 8-10 pounds per cubic foot. It has been determined that this density works well for vehicle wash elements. However, a variety of other materials may also be employed. Also, materials with varying densities may also be utilized.

Figure 3:
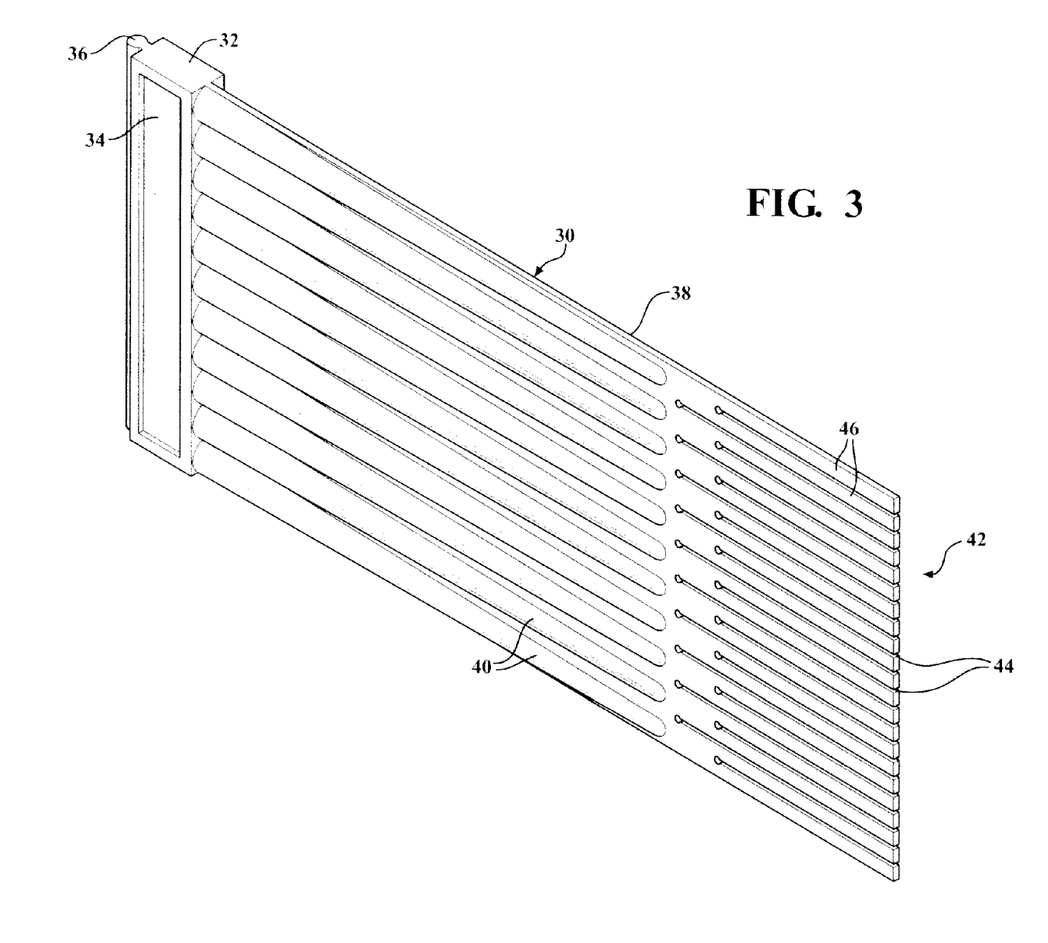
FIG. 3 is perspective view of a media element in accordance with another aspect of the present disclosure.

FIG. 3 illustrates a media element 30 in accordance with another aspect of the present disclosure. According to this aspect, the media element 30 includes a spine portion 32 with recessed face areas 34, and a protuberance 36 extending from an inner end. The protuberance 36 is adapted to fit into a similarly configured slot in a hub portion, such as identified by reference number 12 in FIG. 1.

The media element 30 includes a sheet portion 38 that is integrally formed with the spine portion 32. The sheet portion 38 may be substantially planar and relatively more flexible than the spine portion 32. The sheet portion 38 may have a plurality of features formed on either side thereof. As shown, according to this aspect, the sheet portion 38 may include a plurality of semi-circular features 40 that are disposed in parallel arrangement on at least one side of the sheet portion 38. It will be appreciated that the semi-circular features 40 may be formed on both sides of the sheet portion 38.

The geometric features 40 increase the stiffness and allow a brush using the media element 30 to be operated at reduced RPM while still being extended outwardly and being capable of exerting sufficient pressure on an exterior surface of a vehicle for cleaning purposes. In accordance with an aspect, the semi-cylindrical features 40 may taper from the spine portion 32 toward the distal end and terminate approximately ⅓ of the overall longitudinal length (l) from the distal end. In addition, the distal end portion 42 of the sheet 38 may be divided into individual finger portions 44 by slots or grooves 46 which are shown as having alternatingly long and short lengths. It will be understood by one of ordinary skill in the art that all of the finger portions 46 may be of the same length if desired. Alternatively, the finger positions 46 can be formed in different ways. More or less finger portions 46 may also be employed and the finger portions may have different lengths and shapes.

According to an aspect, the media element 30 may be formed of the same material and by virtue of the same process as the media element 10 and the details of that process are hereinafter described.

Figure 4:
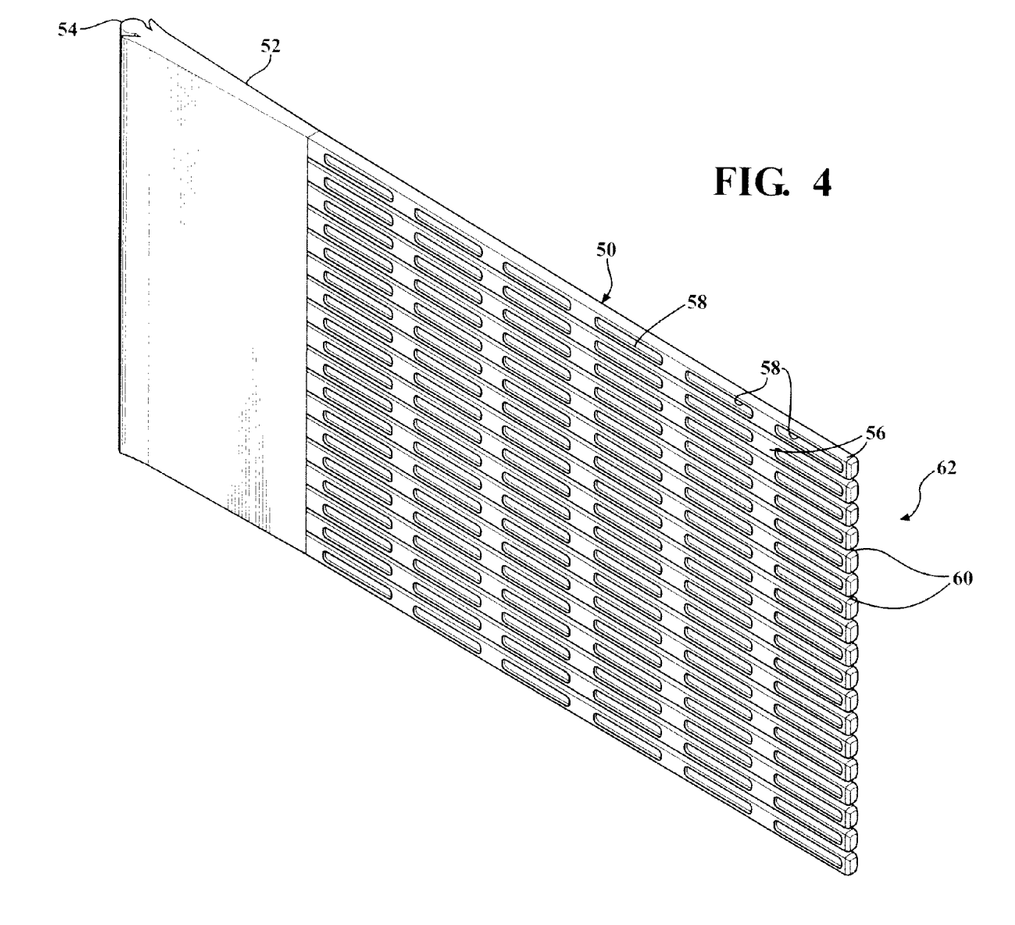
FIG. 4 is a perspective view of media element in accordance with still another aspect of the present disclosure.

Referring now to FIG. 4, there is shown still another media element 50 in accordance with the present disclosure. As shown, the media element 50 includes a relatively stiff spine portion 52 with an edge feature or protuberance 54 adapted to fit into a slot or other securement mechanism of the hub portion, such as designated by reference number 12 in FIG. 1. The spine portion 52 generally tapers or decreases in width as it extends away from the protuberance feature. It will be appreciated that the spine portion 52 can have a variety of different configurations. According to an aspect, the media element 50 may include a plurality of molded finger portions 56 that extend at right angles outwardly from the spine portion 52. As shown, the finger portions 56 may include a plurality of slotted openings 56 formed therein. The slotted openings 58 can extend the entire width of the element or they may instead be formed as recesses in one or both faces thereof.

According to an aspect, the slotted openings 58 may be formed in rows and provide volume for retaining soap, water and dirt which has been picked up from the surface of a vehicle. As shown, the finger portions 56 can be subdivided by grooves 60 that may extend fully to the spine portion 52 or only partially thereto, as desired. The slots 54 can extend all the way from the distal end 62 of the element 50 to the spine portion 52. According to an aspect, the finger portions 56 are substantially more flexible than the tapered spine portion 52.

Figure 5:
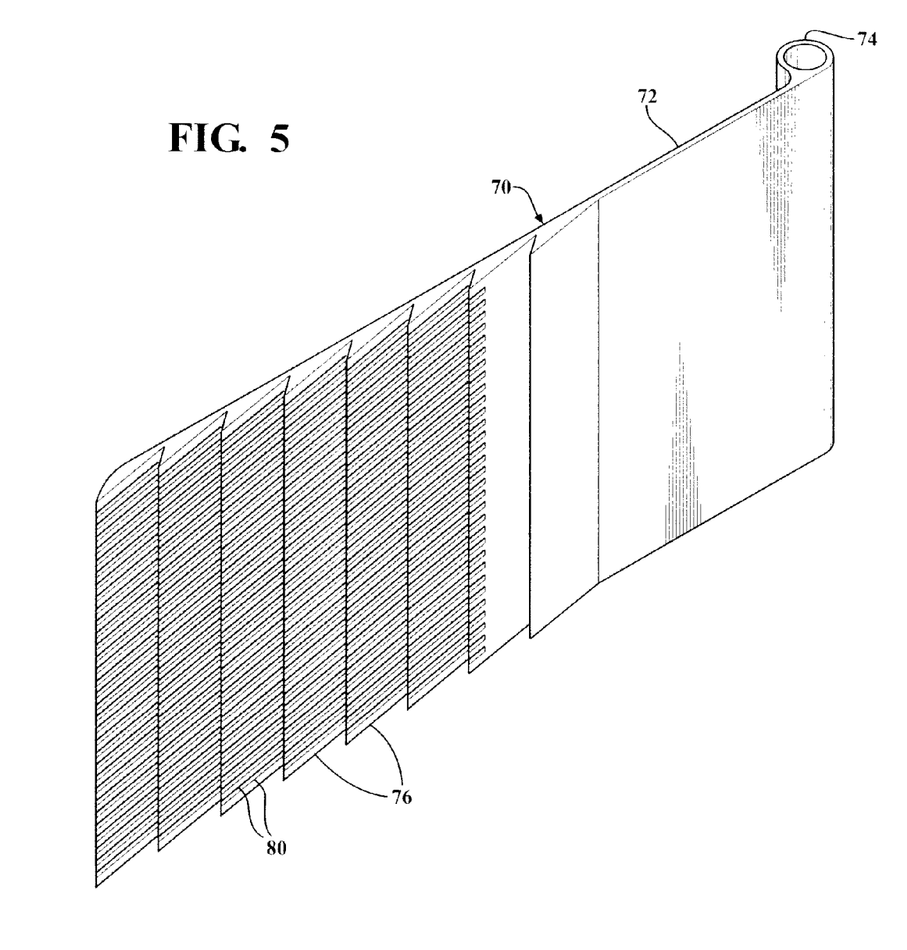
FIG. 5 is a perspective view of a media element in accordance with still a further aspect of the present disclosure.

Referring to FIG. 5, there is shown still another media element 70 which, like the previous exemplary media elements disclosed, is injection molded from a polyethylene/EVA compound which is foamed to produce a closed cell composition. According to an aspect, the media element 70 may have an enlarged sheet-like spine portion 72 with an attachment feature 74, which may be adapted to slide into a slot or other suitable securement mechanism in a hub portion substantially similar to the hub portion 12 shown in FIG. 1. In accordance with this aspect, the attachment feature 74 is a loop that is configured to receive a bead or the like therethrough, which can then be engaged with the media securement mechanism on the hub portion.

The media element 70 may have a plurality of contact elements 76 extending at an angle with respect to a front face 78 of the media element 70. According to an aspect, the contact elements 76 may have a shingled or "shark toothed" geometry to capture soap and water and reduce slapping noise in operation. The contact elements 76 are not only shingled or "shark toothed", but also may be divided into individual finger portions 80. According to an aspect, the contact elements 76 can be integrally formed with the spine portion 72. Alternatively, the contact elements 76 could be separate structures that are attached to the media element 70.

Figure 6:
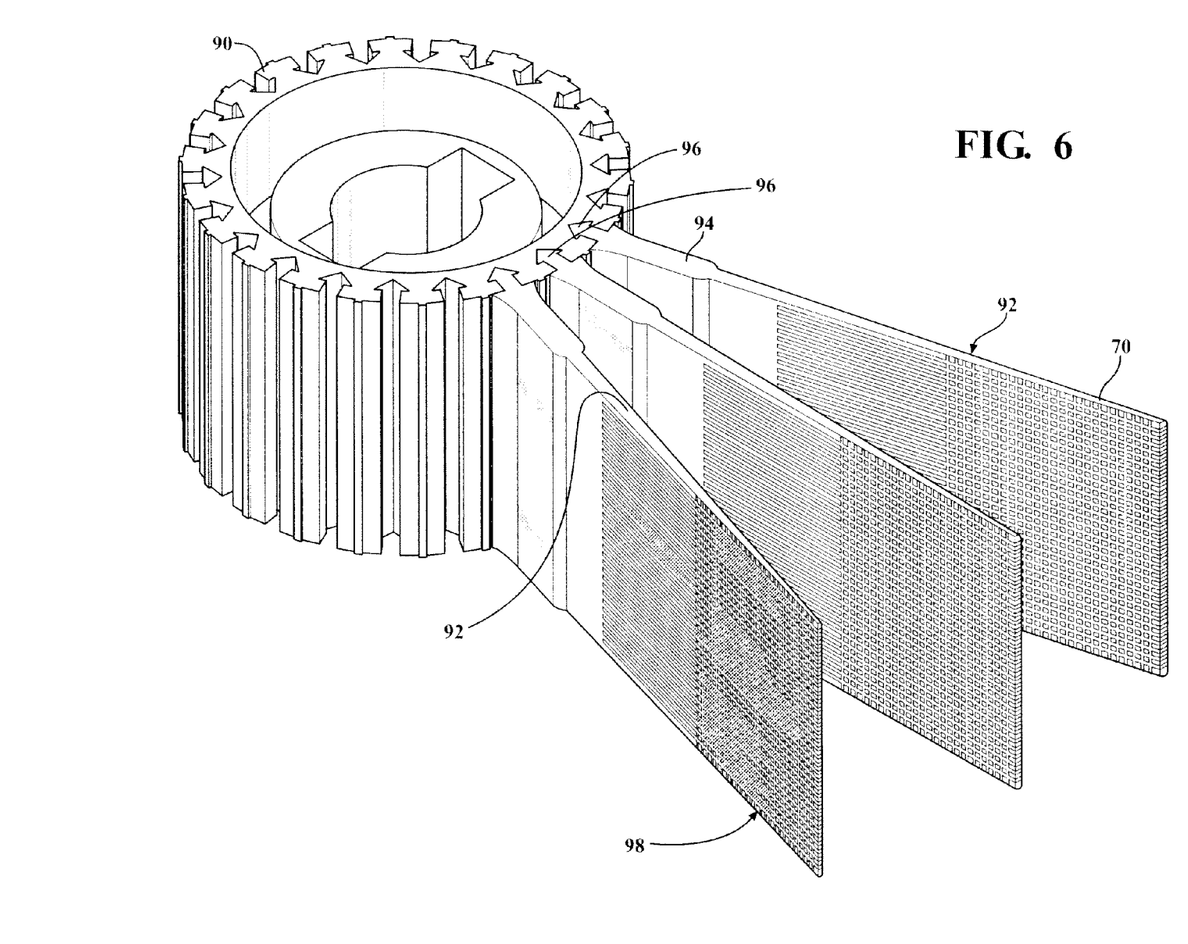
FIG. 6 is a perspective view of a hub portion with a plurality of media elements attached in accordance with yet another aspect of the present disclosure.

Referring to FIG. 6, a hub portion 90 is shown with a plurality of media elements 92 attached. The media elements 92 are constructed in accordance with still a further aspect of the present disclosure. According to an aspect, the media elements 92 may each include a thick, spine portion 94 with an attachment feature 96 similar to those of the embodiment of FIG. 1. The media elements 92 also may include a contact portion 98. As shown, the contact portion 98 can include a plurality of finger portions 100. In this aspect, the finger portions 100 are only formed partially into the front face 102. It will be understood that the finger portions 100 can be formed in both faces and may have different lengths and depths.

In accordance with this aspect, the media elements can also include a textured portion 104 that consists of a grid pattern having both length wise and height wise contact elements 106. These contact elements 106 can be created during the molding process and can yield improved cleaning capabilities. As shown, according to an aspect, the media elements 92 can be formed such that they taper in width along their length from the attachment feature 96 toward the contact elements 106.

Figure 7:
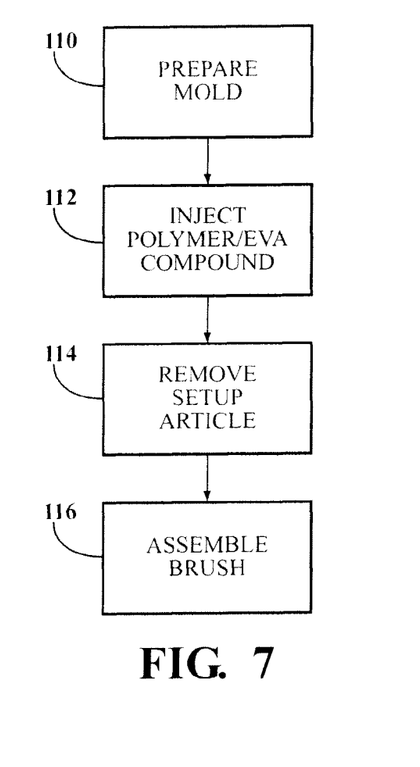
FIG. 7 is a flow diagram schematically illustrating a method of making the media and brush in accordance with the present disclosure.

Referring now to FIG. 7, a method for manufacturing a media element according to aspects of the present disclosure will be described. Because the manufacturing method is essentially an injection molding process, the first step 110 is to prepare a mold, typically in two parts, with an interior geometry which corresponds to the overall exterior geometry of the media element to be formed. Two-mold elements, as persons skilled in the injection molding art will understand, are joined together to form a cavity having a parting line or plane equipped with an inlet or sprue to receive an injected fluid polymeric/EVA compound premixed with a foaming agent in such a way as to substantially fill the cavity formed by the joined mold elements whereby the media element is created. The mold may also be provided with heating and cooling capabilities to keep the injected material in a fluid form for a short time and then to chill or cool the mold to set up the material before the mold is opened and the finished media element is removed. It may also be desirable to use air or another gas to assist the introduction of the fluid plastic into the mold.

The injection step 112 may be carried out using pressurizing machinery well known to persons skilled in the injection molding art. As shown in step 112, the compound injected may be an alloy or mixture of a polymer such as polyethylene, EVA, alloying agent and a foaming agent. Other suitable compounds may also be employed.

After the injected foam article has had an opportunity to cool and set up, step 114 can be carried out by opening the mold and removing a fully set up article. Step 116 is not part of the molding process; rather, it is an additional step of assembling the molded elements to a suitable hub portion such as the structure shown at 12 in FIG. 1 to create a rotary vehicle wash implement. It will be understood that various other types of both rotary and oscillatory structures may be created using the media illustrated herein. For example, the media may be made longer than as shown here and assembled into a curtain which is oscillated over a vehicle in the manner of a Mitter curtain. More conventionally, the media may be assembled into rotary devices commonly called brushes which are mounted either with substantially vertical axes to clean the side surfaces of the vehicle or with a substantially horizontal axis to clean the top surface of an vehicle; e.g., the hood, windshield, top, back and trunk.

Summarizing, the disclosure found herein provides an enabling teaching which includes a novel vehicle wash media, a method of making such media and one or more implements such as brushes for utilizing the media in an industrial application Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A method of forming a vehicle wash component, comprising:
    providing a mold for forming a one-piece media element of the vehicle wash component, wherein the mold includes a cavity corresponding to the media element having an attachment segment to facilitate attachment to a vehicle wash component, a contact segment disposed opposite the attachment segment for contacting a vehicle to provide a cleaning function, the contact segment having a height and width and including a plurality of individually moveable contact element, and a spring portion disposed adjacent the attachment segment to impart rigidity to the media element, the spring portion having a height and width and whereby the width of the spring portion is larger than the width of the contact segment;
    injecting a polymer compound into the mold to form the one-piece media element including the attachment segment, the contact segment with individually moveable contact elements, and spring portion, whereby the at least one media element is substantially self-supporting along its length;
    removing the media element from the mold; and
    attaching the media element to a hub portion of the vehicle wash component.

2. The method of claim 1, wherein the polymer is an EVA compound.

3. The method of claim 2, further comprising:
    forming a plurality of media elements for individual attachment to the hub portion.

4. The method of claim 2, wherein the attachment segment consists of a protuberance for mating with a slot formed on the hub portion.

5. The method of claim 2, wherein the attachment segment consists of a loop for receiving a bead therethrough for securing the media element in a media securement mechanism formed on the hub portion.

6. The method of claim 2, further comprising a support segment to impart a self-erecting characteristic to the media element.

7. The method of claim 2, wherein the support segment comprises a thick block portion.

8. The method of claim 7, wherein the support segment further comprises:
    a plurality of support structures formed in at least one side of the media element, wherein the support structures are raised with respect to a first side of the media element.

9. The method of claim 8, wherein the plurality of elongated raised support structures consist of semi-circles.

10. The method of claim 9, wherein the plurality of elongated raised support structures taper in width in a direction from the attachment segment to the contact segment.

11. The method of claim 9, wherein the plurality of raised support structures are formed in both sides of the media elements.

12. The method of claim 2, wherein the contact segment includes a plurality of finger portions that are moveable with respect to one another.

13. The method of claim 12, wherein individual finger portions are included in both height wise and width wise directions.

14. The method of claim 12, wherein the plurality of finger portions have different dimensions.

15. The method of claim 12, wherein the contact segment further includes:
    a plurality of slotted openings formed in at least one side face of the media element;
    wherein the plurality of slotted openings are formed on the plurality of finger portions.

16. The method of claim 12, wherein the contact segment further includes:
    a plurality of shingled portions;
    wherein the plurality of finger portions are formed on the plurality of shingled portions.

17. A method of forming a media element for attachment to a vehicle wash component, comprising:
    providing a mold for forming the media element of the vehicle wash component, wherein the mold includes a cavity configured to form a unitary one-piece media element having a first surface and a second surface, an attachment portion at a first end of the media element, a plurality of treatment elements adjacent a second end and a plurality of integrally formed contact elements projecting outward from a middle section of the first surface and the second surface which also provide rigidity to the media element;
    injecting a polymer compound into the mold to form the media element;
    removing the media element from the mold.

18. The method of claim 17, wherein the polymer is an EVA compound.

19. The method of claim 17, wherein the attachment portion consists of a protuberance for mating with a corresponding slot formed in the hub portion.

20. The method of claim 17,
    wherein the plurality of contact elements have a different configuration than the plurality of treatment elements.

21. The method of claim 20, wherein the plurality of treatment elements consist of finger portions.

* * * * *